United States Patent [19]
Mori et al.

[11] Patent Number: 5,275,988
[45] Date of Patent: Jan. 4, 1994

[54] CERAMIC COMPOSITION

[75] Inventors: Toru Mori; Mitsuru Furuya; Atsushi Ochi, all of Tokyo, Japan

[73] Assignee: NEC Corporation, Tokyo, Japan

[21] Appl. No.: 865,445

[22] Filed: Apr. 9, 1992

[30] Foreign Application Priority Data

Apr. 12, 1991 [JP] Japan ............... 3-106469
Apr. 12, 1991 [JP] Japan ............... 3-106470
Nov. 28, 1991 [JP] Japan ............... 3-337864

[51] Int. Cl.$^5$ ............................................. C04B 35/46
[52] U.S. Cl. ............................... 501/136; 501/135
[58] Field of Search ............... 501/135, 136, 139, 137

[56] References Cited

U.S. PATENT DOCUMENTS 4,712,156 12/1987 Bardham ........................... 501/135
4,751,209 6/1988 Yokotani et al. ................. 501/138

FOREIGN PATENT DOCUMENTS 2-009760 1/1990 Japan .

*Primary Examiner*—Mark L. Bell
*Assistant Examiner*—Deborah Jones
*Attorney, Agent, or Firm*—Leydig, Voit & Mayer

[57] ABSTRACT

A ceramic composition is herein disclosed, which is a lead-type perovskite compound capable of being subjected to low temperature-sintering among ceramic compositions for use in making capacitors, which has a high dielectric constant at room temperature of not less than 10000, a low temperature-dependency of the dielectric constant and a low decrease in capacitance upon application of a DC bias and which comprises, as a main constituent, a ternary system comprising lead magnesium niobate: $[Pb(Mg_{\frac{1}{3}}Nb_{\frac{2}{3}})O_3]$, lead nickel niobate: $[Pb(Ni_{\frac{1}{3}}Nb_{\frac{2}{3}})O_3]$ and lead titanate: $[PbTiO_3]$ in which part of the $Pb^{2+}$ ions present in the ternary system are substituted with a desired amount of $Sr^{2+}$ ions, $Ba^{2+}$ ions or $Ca^{2+}$ ions.

9 Claims, 7 Drawing Sheets

——— NO SUBSTITUTION

------ $Ba^{2+}$-SUBSTITUTION : 10 mole %

—·—·— $Ba^{2+}$-SUBSTITUTION : 25 mole %

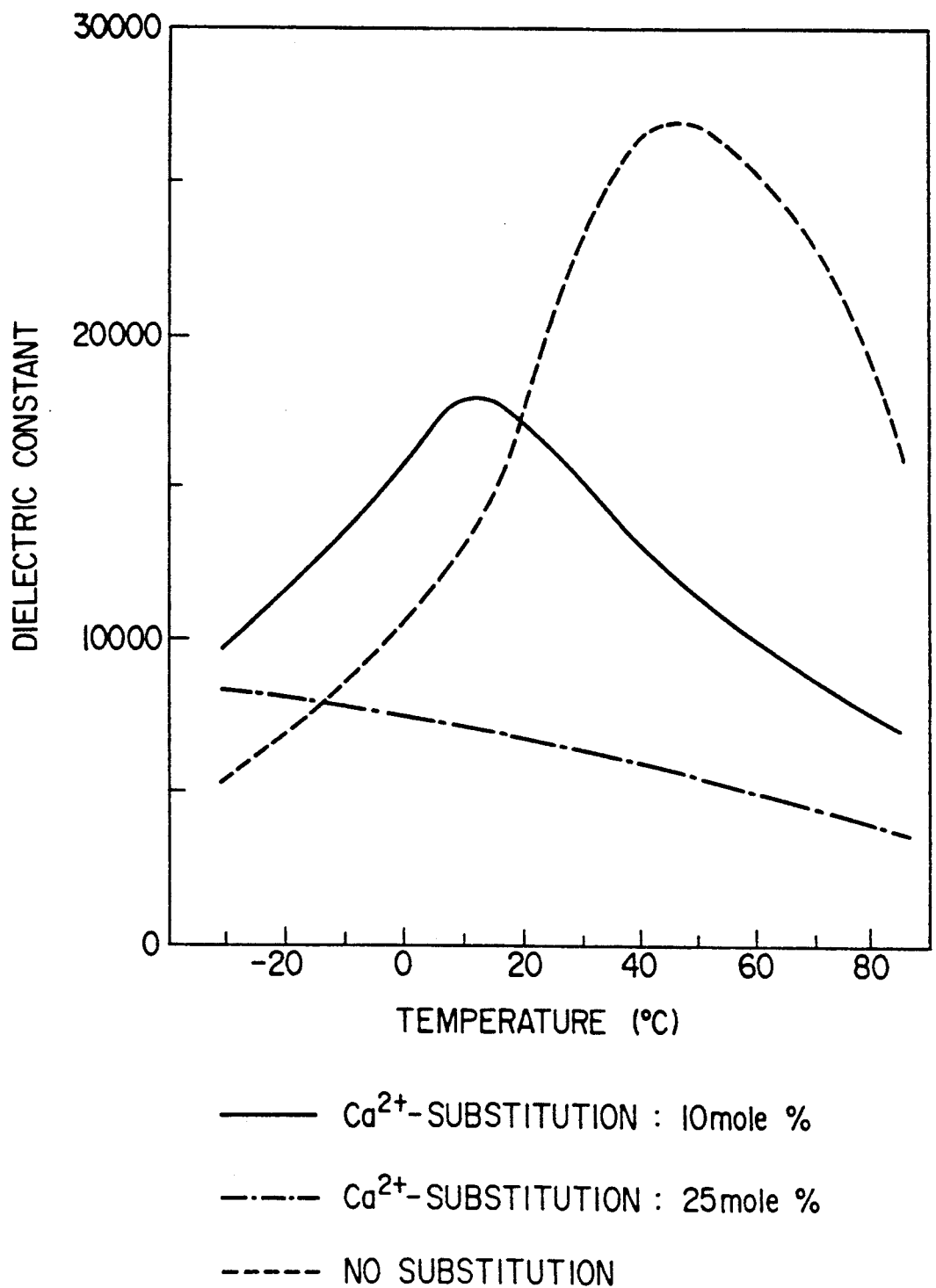

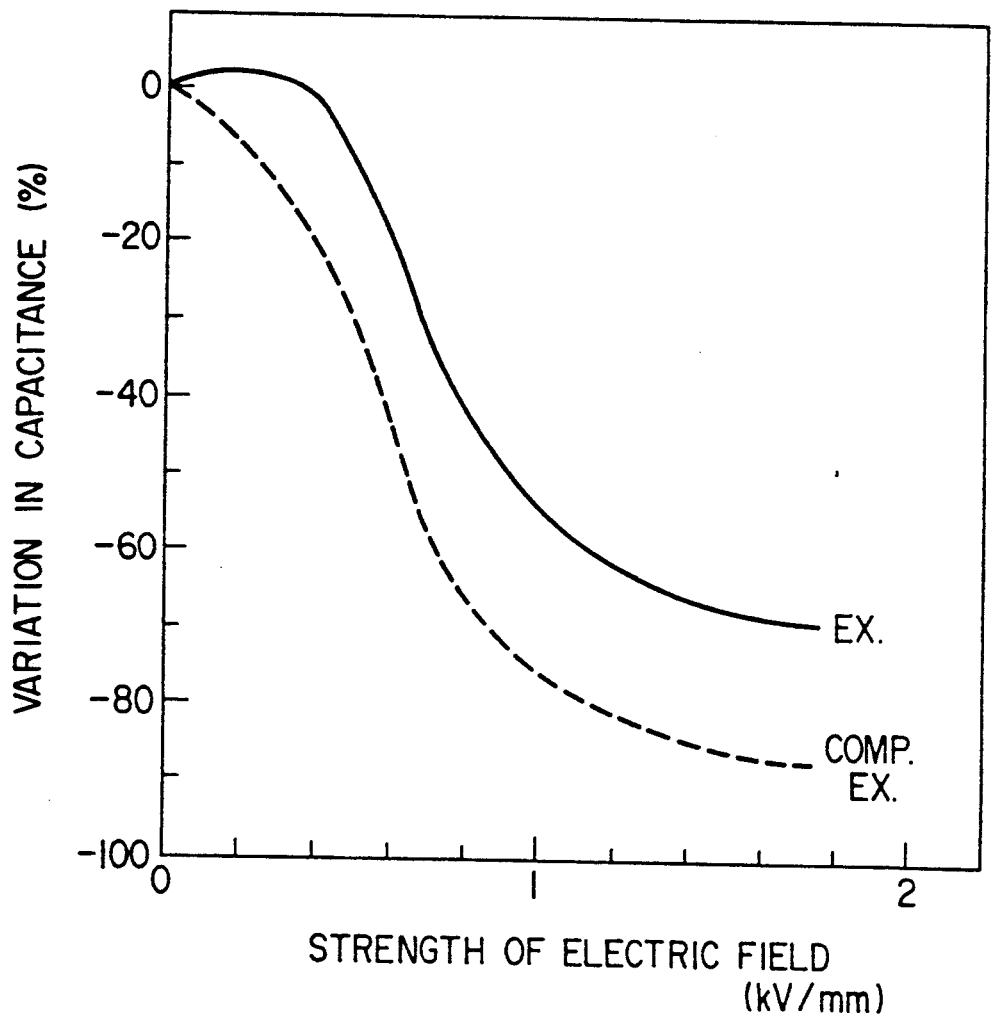

CERAMIC COMPOSITION

BACKGROUND OF THE INVENTION

1. Field of the Invention

The present invention relates to a ceramic composition and in particular to a ceramic composition which has a high dielectric constant and insulation resistance, a low rate of variation in dielectric constant with temperature and a low decrease in dielectric constant upon application of a DC bias.

2. Description of the Prior Art

When a multilayer capacitor is produced from a ceramic composition, the ceramic composition should be selected so that it satisfies several requirements. The composition should have a dielectric constant and a specific resistivity as high as possible and that a rate of variation in dielectric constant with temperature, dielectric loss and drop in dielectric constant due to DC bias application should be as low as possible. Among ceramic compositions having high dielectric constants, those mainly comprising barium titanate ($BaTiO_3$) are well known. However, these compositions require a high sintering temperature. Accordingly, an additive such as calcium titanate ($CaTiO_3$) or lead titanate ($PbTiO_3$) is incorporated to improve temperature-dependent characteristics. However the sintering temperature thereof is still on the order of not less than 1300° C. For this reason, when the ceramic composition mainly comprising barium titanate is used in making a multilayer ceramic capacitor, materials for internal electrodes thereof are limited to, for example, noble metals (e.g., platinum and palladium) which can withstand such a high sintering temperature. Further, the dielectric constant achieved by these dielectric ceramic compositions is at highest about 8000. The dielectric constant thereof may be increased, but, at a cost of temperature stability. More specifically, these ceramic compositions simply satisfy Y5V characteristics ($-30°$ to 85° C.; $+22\%$, $-82\%$) as defined in the EIA Standards.

Although a ceramic material showing a low rate of variation in dielectric constant with temperature can be produced from the conventional material, the dielectric constant of the resulting ceramic composition is too low (on the order of about 2000) to use as a material for capacitors.

To reduce the expenses for producing multilayer ceramic capacitors, it is necessary to develop a ceramic composition capable of being sintered at a low temperature on the order of not more than 1150° C., and which uses less expensive materials for internal electrodes of capacitors such as those mainly comprising silver or nickel. Recently, there have been proposed various lead-based composite perovskite type compounds having low sintering temperatures and high dielectric constants. For instance, a ternary composition comprising lead magnesium niobate [$Pb(Mg_{\frac{1}{3}}Nb_{\frac{2}{3}})O_3$], lead nickel niobate [$Pb(Ni_{\frac{1}{3}}Nb_{\frac{2}{3}})O_3$] and lead titanate ($PbTiO_3$) can achieve a dielectric constant at room temperature of not less than 10000 (see U.S. Pat. No. 4,712,156). However, this three-component system suffers from a problem of high temperature-dependency of the dielectric constant. Moreover, the capacitances thereof are greatly reduced upon application of a DC bias and correspondingly, the resulting capacitors are greatly limited in their practical applications.

SUMMARY OF THE INVENTION

Accordingly, an object of the present invention is to provide a ceramic composition which comprises the foregoing three-component system and exhibits a high dielectric constant on the order of not less than 10000, a substantially improved temperature-dependency thereof and a small drop in capacitance upon application of a DC bias.

The foregoing and other objects and features of the present invention will be apparent from the following description.

According to the present invention, there is provided a ceramic composition which comprises, as a main constituent, a ternary system essentially consisting of lead magnesium niobate [$Pb(Mg_{\frac{1}{3}}Nb_{\frac{2}{3}})O_3$], lead nickel niobate, [$Pb(Ni_{\frac{1}{3}}Nb_{\frac{2}{3}})O_3$] and lead titanate [$PbTiO_3$] and being expressed by the following general formula: $[Pb(Mg_{\frac{1}{3}}Nb_{\frac{2}{3}})O_3]_x[Pb(Ni_{\frac{1}{3}}Nb_{\frac{2}{3}})O_3]_y[PbTiO_3]_z$ wherein the subscripts x, y and z satisfy the following relation: $x+y+z=1.0$ and fall within the range defined by and be on the line segments joining the following seven points (a) to (g) which are given by the coordinates:

| | | | |
|---|---|---|---|
| (x = 0.10, | y = 0.70, | z = 0.20) | (a) |
| (x = 0.10, | y = 0.475, | z = 0.425) | (b) |
| (x = 0.625, | y = 0.05, | z = 0.325) | (c) |
| (x = 0.75, | y = 0.05, | z = 0.20) | (d) |
| (x = 0.75 | y = 0.15, | z = 0.10) | (e) |
| (x = 0.50, | y = 0.40, | z = 0.10) | (f) |
| (x = 0.15, | y = 0.70, | z = 0.15) | (g) | on the triangular ternary-system diagram; and wherein part of lead ions ($Pb^{2+}$) of the main constituent are substituted with 0.01 to 30 mole % of strontium ions ($Sr^{2+}$), 0.01 to 25 mole % of barium ions ($Ba^{2+}$) or 0.01 to 25 mole % of calcium ions ($Ca^{2+}$)

BRIEF EXPLANATION OF THE DRAWINGS

FIG. 6 is a graph showing the temperature-dependency of the dielectric constant of a further embodiment of the ceramic composition according to the present invention in which x, y and z are 0.50, 0.30 and 0.20 respectively and the amount of $Ca^{2+}$-substitution is 0, 10 or 25 mole %; and FIG. 7 is a graph in which the rate of variation in capacitance observed when a DC bias is applied to a multilayer ceramic capacitor is plotted against the strength of DC electric field per layer of the capacitor (as determined in Example 6 and Comparative Example 3).

DESCRIPTION OF THE PREFERRED EMBODIMENTS

Figure 1:
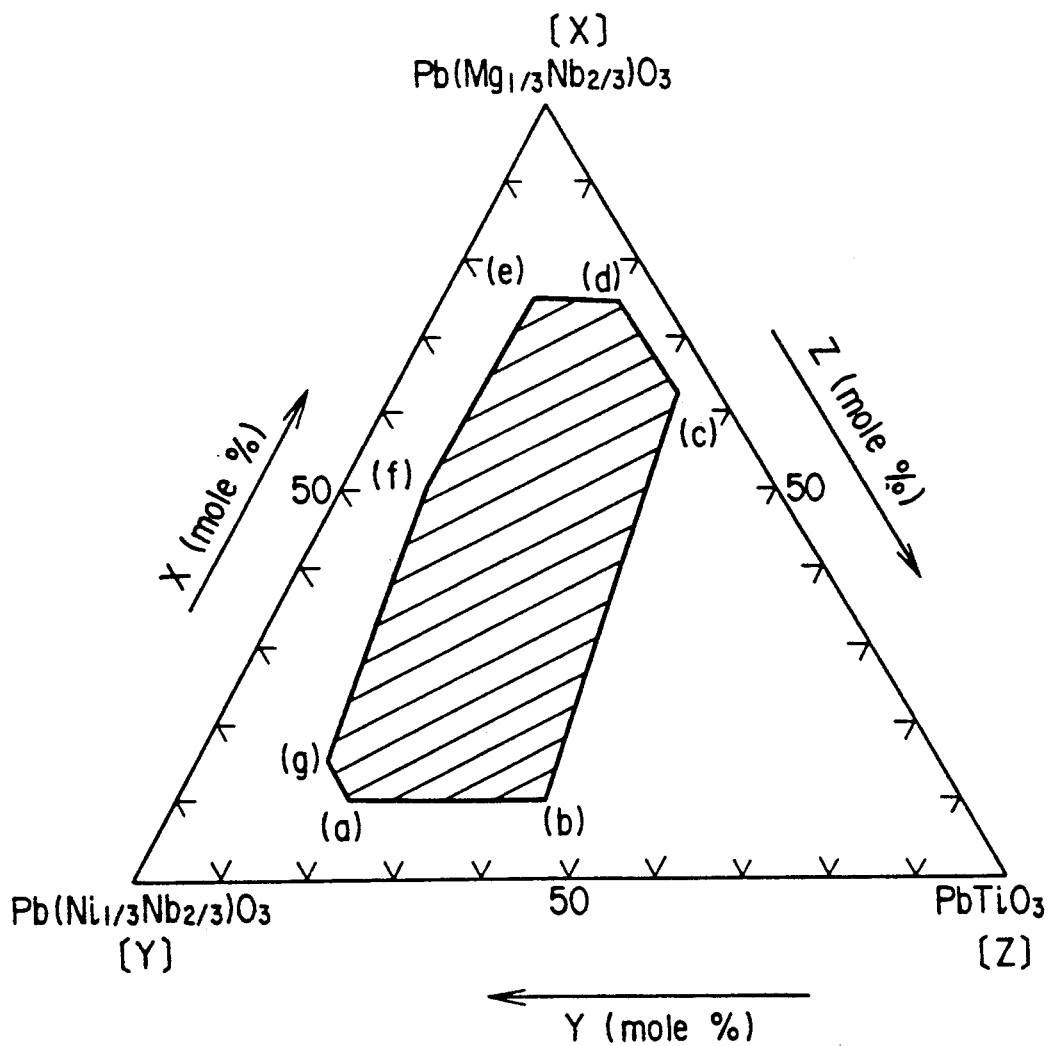
FIG. 1 is the ternary-system diagram for $Pb(Mg_{\frac{1}{3}}Nb_{\frac{2}{3}})O_3$-$Pb(Ni_{\frac{1}{3}}Nb_{\frac{2}{3}})O_3$-$PbTiO_3$ showing the acceptable compositional range of the main constituent of the ceramic composition of the present invention.

The ternary-system diagram of the $Pb(Mg_{\frac{1}{3}}Nb_{\frac{2}{3}})O_3$-$Pb(Ni_{\frac{1}{3}}Nb_{\frac{2}{3}})O_3$-$PbTiO_3$ system, illustrating the compositional range of the main constituent of the ceramic composition of the present invention is shown in FIG. 1. In this figure (a) to (g) are coordinates in the ternary-system diagram and the acceptable compositional range is shown as the shadowed portion in the figure including the boundary lines.

In the ceramic composition of the present invention, the amount of $Sr^{2+}$ ions with which $Pb^{2+}$ ions in the main constituent are substituted ranges from 0.01 to 30 mole %, preferably 2 to 20 mole %; that of $Ba^{2+}$ ions ranges from 0.01 to 25 mole %, preferably 2 to 20 mole %; and that of $Ca^{2+}$ ions ranges from 0.01 to 25 mole %, preferably 2 to 20 mole %.

The present invention will hereinafter be described in more detail with reference to the following nonlimitative working Examples and the effects practically achieved by the present invention will also be discussed in detail in comparison with Comparative Examples.

EXAMPLE 1

In this Example, there were used, as starting materials, lead oxide (PbO), magnesium oxide (MgO), niobium oxide ($Nb_2O_5$), nickel oxide (NiO), titanium oxide ($TiO_2$) and strontium carbonate ($SrCO_3$) and these starting materials were weighed so as to satisfy the compounding ratio as shown in Tables 1 to 3.

These weighed starting materials were subjected to wet-milling and mixing in a ball mill, calcined at 800° to 850° C., followed by re-milling of the resulting powder in a ball mill, filtration, drying, addition of an organic binder, sizing and pressing to give two disk-like samples having a diameter of about 16 mm and a thickness of about 2 mm as well as a cylindrical sample having a diameter of about 16 mm and a thickness of about 10 mm. The latter was used in the subsequent determination of sintering density.

Then the pressed disk-like samples were fired at a temperature ranging from 1100° to 1150° C. for one hour. Then silver electrodes were printed onto both faces of the fired disk-like samples at 600° C. and the capacitances and dielectric losses thereof were determined at a frequency of 1 kHz, a voltage of 1 V r.m.s. and room temperature using a digital LCR meter to obtain the dielectric losses and capacitances thereof. Moreover, an electric current upon application of a DC voltage of 50 V for one minute to the samples was determined by an insulation resistance tester to obtain the specific resistivity of each sample. The dielectric constant was obtained from the capacitance determined. In addition, capacitances were determined at −30° and 85° C. to obtain the variation in dielectric constant with temperature as a value relative to that observed at 20° C.

Tables 1 to 3 show the compounding ratio: x, y and z of the main constituent: $[Pb(Mg_{\frac{1}{3}}Nb_{\frac{2}{3}})O_3]_x[Pb(Ni_{\frac{1}{3}}Nb_{\frac{2}{3}})O_3]_y[PbTiO_3]_z$ of the resulting ceramic composition and the amount of $Sr^{2+}$ ions with which $Pb^{2+}$ ions in the main constituent were substituted, and Tables 4 to 6 show the dielectric constant as determined at room temperature, the dielectric loss, the specific resistivity and the variations of dielectric constants (relative to that observed at 20° C.) determined at −30° C. and 85° C.

In these table, the asterisk (*) means that the compounding ratio of the main constituent of the corresponding sample is beyond the range defined in the present invention and the double asterisk (**) means that the amount of $Sr^{2+}$-substitution thereof is beyond the range defined in the present invention.

TABLE 1

Compounding Ratios of Sample Nos. 1 to 20

| Sample No. | $Pb(Mg_{\frac{1}{3}}Nb_{\frac{2}{3}})O_3$ (mole %) | $Pb(Ni_{\frac{1}{3}}Nb_{\frac{2}{3}})O_3$ (mole %) | $PbTiO_3$ (mole %) | Amount of $Sr^{2+}$-Substitution (mole %) |
|---|---|---|---|---|
| 1* | 80 | 0 | 20 | 10 |
| 2** | 75 | 15 | 10 | 0 |
| 3 | 75 | 15 | 10 | 2 |
| 4 | 75 | 15 | 10 | 10 |
| 5** | 75 | 5 | 20 | 0 |
| 6 | 75 | 5 | 20 | 10 |
| 7 | 75 | 5 | 20 | 30 |
| 8** | 65 | 10 | 25 | 0 |
| 9 | 65 | 10 | 25 | 10 |
| 10** | 62.5 | 5 | 32.5 | 0 |
| 11 | 62.5 | 5 | 32.5 | 30 |
| 12** | 62.5 | 5 | 32.5 | 35 |
| 13** | 60 | 20 | 20 | 0 |
| 14 | 60 | 20 | 20 | 10 |
| 15 | 60 | 20 | 20 | 30 |
| 16* | 50 | 40 | 10 | 0 |
| 17* | 50 | 40 | 10 | 5 |
| 18** | 50 | 30 | 20 | 0 |
| 19 | 50 | 30 | 20 | 0.01 |
| 20 | 50 | 30 | 20 | 2 |

TABLE 2

Compounding Ratios of Sample Nos. 21 to 40

| Sample No. | $Pb(Mg_{\frac{1}{3}}Nb_{\frac{2}{3}})O_3$ (mole %) | $Pb(Ni_{\frac{1}{3}}Nb_{\frac{2}{3}})O_3$ (mole %) | $PbTiO_3$ (mole %) | Amount of $Sr^{2+}$-Substitution (mole %) |
|---|---|---|---|---|
| 21 | 50 | 30 | 20 | 10 |
| 22 | 50 | 30 | 20 | 30 |
| 23** | 50 | 20 | 30 | 0 |
| 24 | 50 | 20 | 30 | 10 |
| 25 | 50 | 20 | 30 | 30 |
| 26* | 50 | 10 | 40 | 0 |
| 27* | 50 | 10 | 40 | 30 |
| 28* | 50 | 10 | 40 | 40 |
| 29** | 40 | 40 | 20 | 0 |
| 30 | 40 | 40 | 20 | 0.01 |
| 31 | 40 | 40 | 20 | 10 |
| 32** | 40 | 30 | 30 | 0 |
| 33 | 40 | 30 | 30 | 10 |
| 34 | 40 | 30 | 30 | 30 |
| 35** | 30 | 40 | 30 | 0 |
| 36 | 30 | 40 | 30 | 10 |
| 37 | 30 | 40 | 30 | 30 |
| 38** | 20 | 50 | 30 | 0 |
| 39 | 20 | 50 | 30 | 10 |
| 40 | 20 | 50 | 30 | 30 |

TABLE 3

Compounding Ratios of Sample Nos. 41 to 52

| Sample No. | Pb(Mg⅓Nb⅔)O₃ (mole %) | Pb(Ni⅓Nb⅔)O₃ (mole %) | PbTiO₃ (mole %) | Amount of $Sr^{2+}$-Substitution (mole %) |
|---|---|---|---|---|
| 41** | 10 | 67.5 | 22.5 | 0 |
| 42 | 10 | 67.5 | 22.5 | 0.01 |
| 43 | 10 | 67.5 | 22.5 | 2 |
| 44** | 10 | 47.5 | 42.5 | 0 |
| 45 | 10 | 47.5 | 42.5 | 30 |
| 46** | 10 | 47.5 | 42.5 | 40 |
| 47* | 5 | 60 | 35 | 0 |
| 48* | 5 | 60 | 35 | 10 |
| 49** | 10 | 70 | 20 | 0 |
| 50 | 10 | 70 | 20 | 2 |
| 51** | 15 | 70 | 15 | 0 |
| 52 | 15 | 70 | 15 | 2 |

TABLE 4

Properties of Samples Nos. 1 to 20

| Sample No. | ε (20° C.) | tan δ (20° C.) (%) | Specific Resistivity (Ω·cm) | Δε/ε (20° C.) −30° C. (%) | Δε/ε (20° C.) 85° C. (%) |
|---|---|---|---|---|---|
| 1* | 5580 | 1.5 | 6.8 × 10¹⁰ | −60.2 | −10.5 |
| 2** | 22560 | 7.3 | 2.1 × 10¹¹ | −63.7 | −64.5 |
| 3 | 21770 | 3.8 | 8.2 × 10¹¹ | −54.3 | −59.1 |
| 4 | 8560 | 1.1 | 1.3 × 10¹² | −35.2 | −55.1 |
| 5** | 13710 | 6.9 | 1.7 × 10¹¹ | −64.1 | +57.3 |
| 6 | 12840 | 2.1 | 9.8 × 10¹¹ | −50.6 | −33.1 |
| 7 | 5500 | 0.5 | 1.7 × 10¹³ | +2.3 | −45.3 |
| 8** | 10320 | 7.1 | 2.6 × 10¹¹ | −54.1 | +72.1 |
| 9 | 14560 | 2.3 | 1.1 × 10¹² | −54.7 | −27.6 |
| 10** | 8310 | 7.6 | 2.9 × 10¹¹ | −52.6 | +51.0 |
| 11 | 8680 | 2.1 | 2.6 × 10¹³ | −54.3 | −47.2 |
| 12** | 6100 | 2.5 | 7.8 × 10¹² | −46.1 | −58.5 |
| 13** | 16720 | 6.5 | 3.1 × 10¹¹ | −62.3 | +13.7 |
| 14 | 12850 | 2.0 | 2.5 × 10¹² | −54.1 | −32.6 |
| 15 | 7240 | 0.7 | 2.9 × 10¹³ | −35.2 | −15.6 |
| 16* | 15200 | 3.1 | 3.0 × 10¹¹ | −56.5 | −70.3 |
| 17* | 6800 | 0.5 | 1.9 × 10¹² | +11.5 | −61.5 |
| 18** | 17080 | 6.9 | 3.9 × 10¹¹ | −68.5 | −5.2 |
| 19 | 19560 | 2.7 | 9.1 × 10¹¹ | −57.1 | −27.4 |
| 20* | 20500 | 1.2 | 2.7 × 10¹² | −54.5 | −41.1 |

TABLE 5

Properties of Samples Nos. 21 to 40

| Sample No. | ε (20° C.) | tan δ (20° C.) (%) | Specific Resistivity (Ω·cm) | Δε/ε (20° C.) −30° C. (%) | Δε/ε (20° C.) 85° C. (%) |
|---|---|---|---|---|---|
| 21 | 14100 | 0.4 | 6.1 × 10¹² | −8.5 | −54.8 |
| 22 | 7320 | 0.1 | 2.0 × 10¹³ | +15.8 | −50.1 |
| 23** | 10240 | 6.5 | 4.9 × 10¹¹ | −21.5 | +41.5 |
| 24 | 12180 | 3.2 | 6.7 × 10¹² | −50.8 | +2.3 |
| 25 | 8680 | 0.9 | 1.9 × 10¹³ | −52.6 | −43.6 |
| 26* | 6120 | 6.3 | 4.5 × 10¹¹ | −20.3 | +85.1 |
| 27* | 6420 | 4.9 | 2.2 × 10¹³ | −37.6 | +40.5 |
| 28* | 4270 | 3.7 | 2.0 × 10¹³ | −48.3 | −11.5 |
| 29* | 18700 | 6.7 | 4.1 × 10¹¹ | −62.6 | −18.3 |
| 30 | 19150 | 3.9 | 8.2 × 10¹¹ | −57.3 | −25.8 |
| 31 | 10400 | 0.2 | 2.7 × 10¹² | −15.8 | −53.8 |
| 32** | 8650 | 6.8 | 4.3 × 10¹¹ | −29.8 | +36.3 |
| 33 | 11300 | 3.6 | 3.6 × 10¹² | −37.5 | +11.2 |
| 34 | 8640 | 0.9 | 2.8 × 10¹³ | −49.7 | −40.5 |
| 35** | 12510 | 7.0 | 4.6 × 10¹¹ | −41.7 | +61.3 |
| 36 | 10800 | 4.1 | 3.4 × 10¹² | −56.8 | +20.6 |
| 37 | 9790 | 1.0 | 3.0 × 10¹³ | −47.3 | −50.5 |
| 38** | 13300 | 6.8 | 4.5 × 10¹¹ | −50.7 | +81.3 |
| 39 | 13850 | 4.6 | 3.1 × 10¹² | −49.6 | +19.6 |
| 40 | 9230 | 0.3 | 3.4 × 10¹³ | −40.6 | −44.8 |

TABLE 6

Properties of Samples Nos. 41 to 52

| Sample No. | ε (20° C.) | tan δ (20° C.) (%) | Specific Resistivity (Ω·cm) | Δε/ε (20° C.) −30° C. (%) | Δε/ε (20° C.) 85° C. (%) |
|---|---|---|---|---|---|
| 41** | 24510 | 3.1 | 5.8 × 10¹¹ | −71.4 | −67.8 |
| 42 | 21400 | 2.9 | 8.6 × 10¹¹ | −60.3 | −61.2 |
| 43 | 18740 | 1.8 | 1.7 × 10¹² | −48.1 | −55.8 |
| 44** | 7210 | 7.5 | 6.0 × 10¹¹ | −36.5 | +39.3 |
| 45 | 10800 | 2.1 | 2.2 × 10¹³ | −52.6 | −45.5 |
| 46** | 5320 | 1.2 | 8.6 × 10¹² | −41.5 | −57.2 |
| 47* | 7220 | 6.5 | 5.7 × 10¹¹ | −46.5 | +42.6 |
| 48* | 6830 | 4.7 | 9.3 × 10¹¹ | −52.8 | +3.7 |
| 49** | 9500 | 4.2 | 6.5 × 10¹² | −52.3 | −43.2 |
| 50 | 7960 | 0.9 | 8.8 × 10¹² | −30.9 | −39.7 |
| 51** | 16250 | 2.3 | 4.3 × 10¹² | −53.8 | −41.2 |
| 52 | 12240 | 1.0 | 7.3 × 10¹² | −34.6 | −38.8 |

Figure 2:
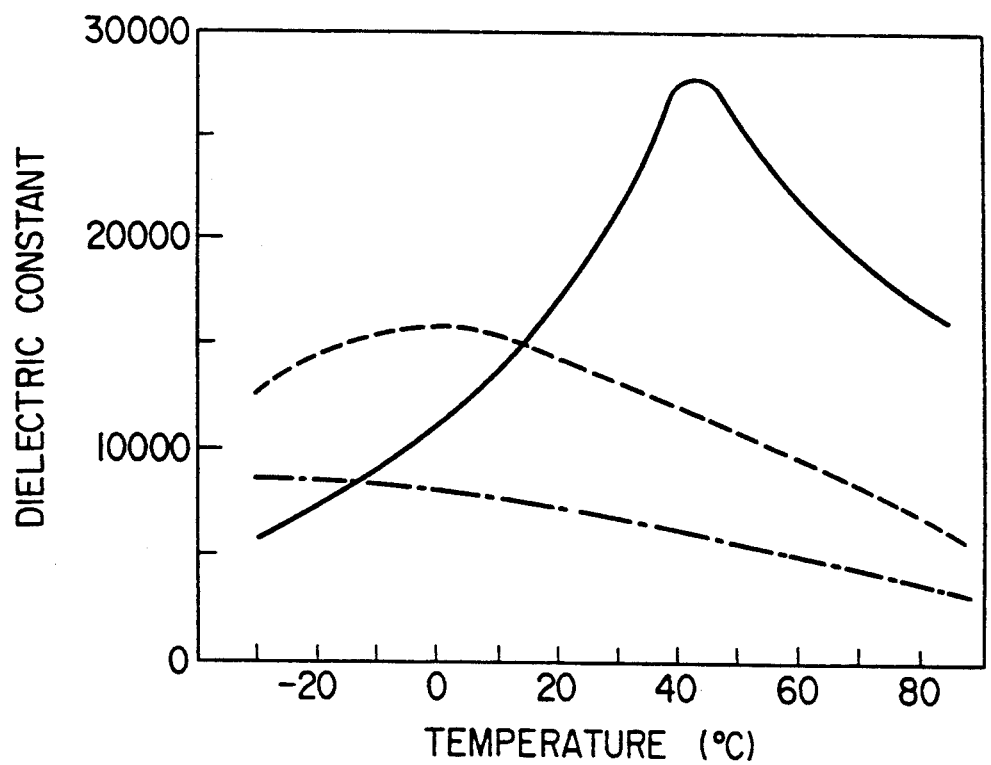
FIG. 2 is a graph showing the temperature-dependency of the dielectric constant of an embodiment of the ceramic composition according to the present invention in which x, y and z are 0.50, 0.30 and 0.20 respectively and the amount of $Sr^{2+}$-substitution is 0, 10 or 30 mole %.

Moreover, to make clear the effect of $Sr^{2+}$-substitution, there is shown, in FIG. 2, the temperature-dependency of the dielectric constant of a ceramic composition whose compounding ratio (x, y, z) was (0.50, 0.30, 0.20) and in which the amount of $Sr^{2+}$-substitution was 0, 10 or 30 mole %.

As seen from the data shown in FIG. 2, there is observed a dielectric constant-depressing effect due to the $Sr^{2+}$-substitution and accordingly the Curie point of the main constituent is shifted towards the lower temperature side. Further, as seen from the data listed in Tables 1 to 6, the composition of the present invention in which part of the $Pb^{2+}$ ions in the main constituent, a ternary system essentially consisting of [Pb(Mg⅓Nb⅔)O₃]-[Pb(Ni⅓Nb⅔)O₃]-[PbTiO₃], is substituted with $Sr^{2+}$ ions has high dielectric constant and specific resistivity at room temperature as well as a low variation in dielectric constant with temperature and thus can satisfy the Y5U characteristics (−30° to 85° C.; +22%, −56%) as defined in the EIA Standards. Furthermore, the composition of the present invention can be sintered at a relatively low temperature on the order of not more than 1150° C. and correspondingly a silver-palladium alloy can be used as a material for the internal electrodes of multilayer ceramic capacitors.

EXAMPLE 2

The same procedures used in Example 1 were repeated to give a dielectric powder except that lead oxide, magnesium oxide, titanium oxide, nickel oxide, niobium oxide and strontium carbonate were correctly dispensed so that the resulting dielectric powder had a compounding ratio: (x, y, z) in the main ingredient represented by [Pb(Mg⅓Nb⅔)O₃]$_x$[Pb(Ni⅓Nb⅔)O₃]$_y$ [PbTiO₃]$_z$ of (0.50, 0.30, 0.20) and 10 mole % of $Pb^{2+}$ ions were substituted with $Sr^{2+}$ ions.

The resulting dielectric powder was dispersed in an organic solvent, kneaded with an organic binder to give a slurry and the resulting slurry was formed into a film having a thickness of 40 μm according to the doctor blade technique currently used. Then a paste for an internal electrode was printed on the film in accordance with the usual screen printing method, followed by stamping out the film into a desired shape, lamination, hot-pressing to give a multilayer body which was then cut into pieces having a desired shape to obtain green chips for capacitors. The resulting green chips were heated to desired temperatures to remove the binder and to fire and then a silver paste was applied thereto to form external electrodes.

The capacitance of the capacitor was determined at room temperature by applying an alternating current having a frequency of 1 kHz and a voltage of 1 V r.m.s. using a digital LCR meter while a DC bias of 0 to 50 V was applied to the multilayer ceramic capacitor with a digital multi meter. The results thus obtained are plotted in FIG. 3.

COMPARATIVE EXAMPLE 1

The same procedures used in Example 2 were repeated except for using a composition having the compounding ratio (x, y, z) in the main constituent represented by $[Pb(Mg_{\frac{1}{3}}Nb_{\frac{2}{3}})O_3]_x[Pb(Ni_{\frac{1}{3}}Nb_{\frac{2}{3}})O_3]_y[PbTiO_3]_z$ of (0.20, 0.60, 0.20) and free of $Sr^{2+}$-substitution to give a capacitor and the capacitance thereof upon applying a DC bias was determined in the same manner described in Example 2. The results obtained are plotted in FIG. 3 together with the results obtained in Example 2.

Figure 3:
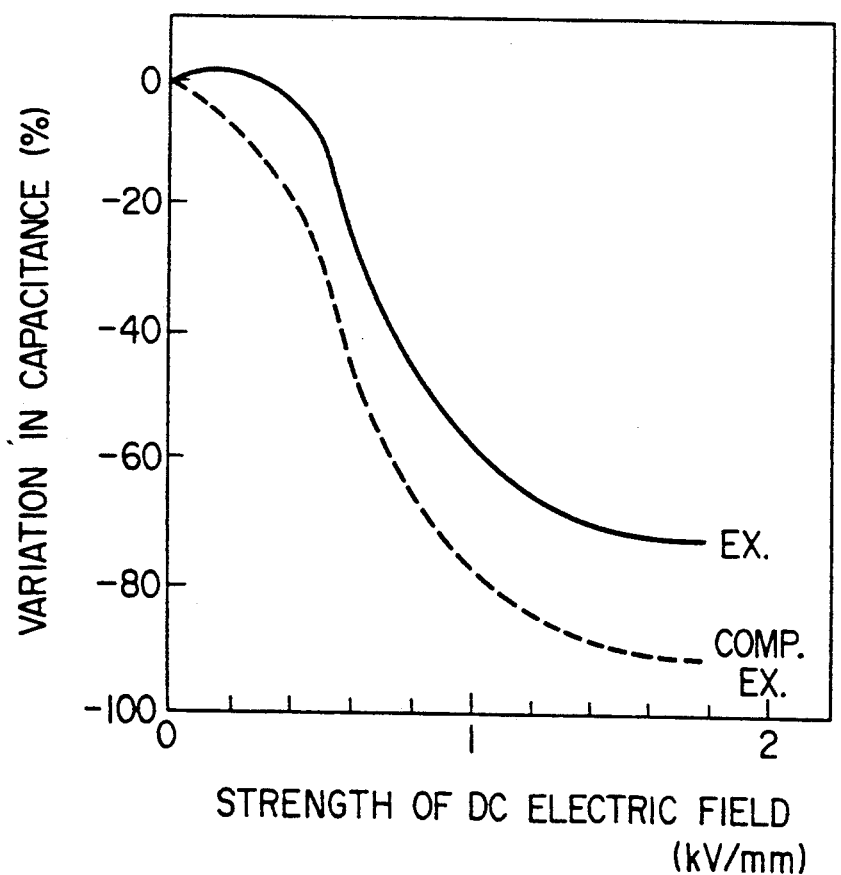
FIG. 3 is a graph in which the rate of variation in capacitance observed when a DC bias is applied to a multilayer ceramic capacitor is plotted against the strength of DC electric field per layer of the capacitor (as determined in Example 2 and Comparative Example 1)

The results shown in FIG. 3 clearly indicate that the capacitor obtained from the ceramic composition of the present invention in which part of $Pb^{2+}$ ions in the main constituent was substituted with $Sr^{2+}$ ions has the DC bias characteristics superior to those for the capacitor obtained using the compositions of Comparative Example 1, which was free of $Sr^{2+}$-substitution.

EXAMPLE 3

In this example, there were used, as starting materials, lead oxide (PbO), magnesium oxide (MgO), niobium oxide ($Nb_2O_5$), nickel oxide (NiO), titanium oxide ($TiO_2$) and barium carbonate ($BaCO_3$) and these starting materials were weighed so as to satisfy the compounding ratio as shown in Tables 7 to 9.

These weighed starting materials were subjected to wet-milling and mixing in a ball mill, calcined at 800° to 850° C., followed by re-milling of the resulting powder in a ball mill, filtration, drying, addition of an organic binder, sizing and pressing to give two disk-like samples having a diameter of about 16 mm and a thickness of about 2 mm and a cylindrical sample having a diameter of about 16 mm and a thickness of about 10 mm. The latter was used in the subsequent determination of sintering density.

Then the pressed disk-like samples were fired at a temperature ranging from 1100° to 1150° C. for one hour. Silver electrodes were printed onto both faces of the fired disk-like samples at 600° C. and the capacitances and dielectric losses thereof were determined at a frequency of 1 kHz, an AC voltage of 1 V r.m.s. and room temperature using a digital LCR meter. Then a current upon application of a DC voltage of 50 V to the samples for one minute was determined using an insulation resistance tester to determine specific resistivities of the samples. The dielectric constant was obtained from the capacitance determined above. Further, the capacitances at −30° and 85° C. were determined to obtain variations in dielectric constants in terms of values relative to that observed at 20° C.

Tables 7 to 9 show the compounding ratio: x, y and z of the main constituent: $[Pb(Mg_{\frac{1}{3}}Nb_{\frac{2}{3}})O_3]_x[Pb(Ni_{\frac{1}{3}}Nb_{\frac{2}{3}})O_3]_y[PbTiO_3]_z$ of the resulting ceramic composition and the amount of $Ba^{2+}$-substitution (mole %) and Tables 10 to 12 show the dielectric constant at room temperature, the dielectric loss, the specific resistivity and the variations of dielectric constants determined at −30° C. and 85° C. (in terms of values relative to that observed at 20° C.) which were determined in this Example.

In these tables, the asterisk (*) means that the compounding ratio of the main constituent of the corresponding sample is beyond the range defined in the present invention and double asterisk (**) means that the amount of $Ba^{2+}$-substitution is beyond the range defined in the present invention.

TABLE 7

Compounding Ratios of Sample Nos. 1 to 20

| Sample No. | $Pb(Mg_{\frac{1}{3}}Nb_{\frac{2}{3}})O_3$ (mole %) | $Pb(Ni_{\frac{1}{3}}Nb_{\frac{2}{3}})O_3$ (mole %) | $PbTiO_3$ (mole %) | Amount of $Ba^{2+}$-Substitution (mole %) |
|---|---|---|---|---|
| 1* | 80 | 0 | 20 | 10 |
| 2** | 75 | 15 | 10 | 0 |
| 3 | 75 | 15 | 10 | 1 |
| 4 | 75 | 15 | 10 | 5 |
| 5** | 75 | 5 | 20 | 0 |
| 6 | 75 | 5 | 20 | 10 |
| 7 | 75 | 5 | 20 | 25 |
| 8** | 65 | 10 | 25 | 0 |
| 9 | 65 | 10 | 25 | 10 |
| 10** | 62.5 | 5 | 32.5 | 0 |
| 11 | 62.5 | 5 | 32.5 | 25 |
| 12** | 62.5 | 5 | 32.5 | 30 |
| 13** | 60 | 20 | 20 | 0 |
| 14 | 60 | 20 | 20 | 5 |
| 15 | 60 | 20 | 20 | 10 |
| 16 | 60 | 20 | 20 | 25 |
| 17* | 50 | 40 | 10 | 0 |
| 18* | 50 | 40 | 10 | 2 |
| 19** | 50 | 30 | 20 | 0 |
| 20 | 50 | 30 | 20 | 0.01 |

TABLE 8

Compounding Ratios of Sample Nos. 21 to 40

| Sample No. | $Pb(Mg_{\frac{1}{3}}Nb_{\frac{2}{3}})O_3$ (mole %) | $Pb(Ni_{\frac{1}{3}}Nb_{\frac{2}{3}})O_3$ (mole %) | $PbTiO_3$ (mole %) | Amount of $Ba^{2+}$-Substitution (mole %) |
|---|---|---|---|---|
| 21 | 50 | 30 | 20 | 2 |
| 22 | 50 | 30 | 20 | 10 |
| 23 | 50 | 30 | 20 | 25 |
| 24** | 50 | 20 | 30 | 0 |
| 25 | 50 | 20 | 30 | 10 |
| 26 | 50 | 20 | 30 | 25 |
| 27* | 50 | 10 | 40 | 0 |
| 28* | 50 | 10 | 40 | 25 |
| 29* | 50 | 10 | 40 | 30 |
| 30** | 40 | 40 | 20 | 0 |
| 31 | 40 | 40 | 20 | 0.01 |
| 32 | 40 | 40 | 20 | 10 |
| 33** | 40 | 30 | 30 | 0 |
| 34 | 40 | 30 | 30 | 10 |
| 35 | 40 | 30 | 30 | 25 |
| 36** | 30 | 40 | 30 | 0 |
| 37 | 30 | 40 | 30 | 10 |
| 38 | 30 | 40 | 30 | 25 |
| 39** | 20 | 50 | 30 | 0 |
| 40 | 20 | 50 | 30 | 10 |

TABLE 9

Compounding Ratios of Sample Nos. 41 to 52

| Sample No. | $Pb(Mg_{\frac{1}{3}}Nb_{\frac{2}{3}})O_3$ (mole %) | $Pb(Ni_{\frac{1}{3}}Nb_{\frac{2}{3}})O_3$ (mole %) | $PbTiO_3$ (mole %) | Amount of $Ba^{2+}$-Substitution (mole %) |
|---|---|---|---|---|
| 41 | 20 | 50 | 30 | 25 |
| 42** | 10 | 67.5 | 22.5 | 0 |
| 43 | 10 | 67.5 | 22.5 | 2 |
| 44** | 10 | 47.5 | 42.5 | 0 |
| 45 | 10 | 47.5 | 42.5 | 25 |
| 46** | 10 | 47.5 | 42.5 | 30 |
| 47* | 5 | 60 | 35 | 0 |
| 48* | 5 | 60 | 35 | 10 |
| 49** | 10 | 70 | 20 | 0 |

TABLE 9-continued

Compounding Ratios of Sample Nos. 41 to 52

| Sample No. | Pb(Mg₁Nb₁)O₃ (mole %) | Pb(Ni₁Nb₁)O₃ (mole %) | PbTiO₃ (mole %) | Amount of Ba²⁺-Substitution (mole %) |
|---|---|---|---|---|
| 50 | 10 | 70 | 20 | 2 |
| 51** | 15 | 70 | 15 | 0 |
| 52 | 15 | 70 | 15 | 2 |

TABLE 10

Properties of Samples Nos. 1 to 20

| Sample No. | ε (20° C.) | tan δ (20° C.) (%) | Specific Resistivity (Ω · cm) | Δε/ε (20° C.) −30° C. (%) | 85° C. (%) |
|---|---|---|---|---|---|
| 1* | 7630 | 3.8 | 7.9 × 10¹⁰ | −59.3 | −22.5 |
| 2** | 22560 | 7.3 | 2.1 × 10¹¹ | −63.7 | −64.5 |
| 3 | 20810 | 4.1 | 6.3 × 10¹¹ | −55.3 | −58.1 |
| 4 | 12340 | 1.9 | 1.1 × 10¹² | −52.6 | −51.2 |
| 5** | 13710 | 6.9 | 1.7 × 10¹¹ | −64.1 | +57.3 |
| 6 | 11530 | 2.3 | 7.7 × 10¹¹ | −57.3 | −21.7 |
| 7 | 8150 | 0.9 | 6.5 × 10¹² | −38.1 | −48.6 |
| 8** | 10320 | 7.1 | 2.6 × 10¹¹ | −54.1 | +72.1 |
| 9 | 12800 | 2.6 | 9.0 × 10¹¹ | −49.2 | −7.6 |
| 10** | 8310 | 7.6 | 2.9 × 10¹¹ | −52.6 | +51.0 |
| 11 | 9560 | 2.7 | 1.3 × 10¹³ | −48.7 | −26.3 |
| 12** | 7630 | 3.1 | 7.2 × 10¹² | −49.3 | −53.6 |
| 13** | 16720 | 6.5 | 3.1 × 10¹¹ | −62.3 | +13.7 |
| 14 | 12380 | 2.9 | 8.3 × 10¹¹ | −45.6 | −39.5 |
| 15 | 9710 | 2.2 | 1.6 × 10¹² | −40.3 | −32.1 |
| 16 | 7320 | 1.1 | 1.4 × 10¹³ | +16.4 | −51.6 |
| 17* | 15200 | 3.1 | 3.0 × 10¹¹ | −56.5 | −70.3 |
| 18* | 8150 | 2.6 | 5.6 × 10¹¹ | −27.5 | −67.1 |
| 19** | 17080 | 6.9 | 3.9 × 10¹¹ | −68.5 | −5.2 |
| 20 | 18320 | 3.2 | 7.7 × 10¹¹ | −55.7 | −31.7 |

TABLE 11

Properties of Samples Nos. 21 to 40

| Sample No. | ε (20° C.) | tan δ (20° C.) (%) | Specific Resistivity (Ω · cm) | Δε/ε (20° C.) −30° C. (%) | 85° C. (%) |
|---|---|---|---|---|---|
| 21 | 20040 | 2.0 | 1.4 × 10¹² | −58.3 | −47.5 |
| 22 | 15300 | 1.1 | 3.8 × 10¹² | −37.9 | −55.8 |
| 23 | 7310 | 0.3 | 9.6 × 10¹² | +20.5 | −52.1 |
| 24** | 10240 | 6.5 | 4.0 × 10¹¹ | −21.5 | +41.5 |
| 25 | 12070 | 3.9 | 2.1 × 10¹² | −53.3 | +32.6 |
| 26 | 7160 | 1.1 | 8.4 × 10¹² | −44.4 | −43.8 |
| 27* | 6120 | 6.3 | 4.5 × 10¹¹ | −20.3 | +85.1 |
| 28* | 5680 | 5.1 | 6.8 × 10¹² | −43.9 | +40.4 |
| 29* | 5210 | 3.9 | 8.2 × 10¹² | −46.2 | +25.0 |
| 30** | 18700 | 6.7 | 4.1 × 10¹¹ | −62.6 | −18.3 |
| 31 | 19620 | 4.2 | 7.4 × 10¹¹ | −59.8 | −24.5 |
| 32 | 11270 | 0.7 | 2.2 × 10¹² | −42.5 | −55.8 |
| 33** | 8560 | 6.8 | 4.3 × 10¹¹ | −29.8 | +36.3 |
| 34 | 10890 | 3.9 | 2.7 × 10¹² | −49.5 | +14.7 |
| 35 | 8220 | 1.1 | 1.5 × 10¹³ | −51.2 | −54.1 |
| 36** | 12510 | 7.0 | 4.6 × 10¹¹ | −41.7 | +61.3 |
| 37 | 11980 | 4.7 | 2.1 × 10¹² | −50.2 | −11.6 |
| 38 | 7330 | 1.9 | 1.8 × 10¹³ | −34.2 | −56.1 |
| 39** | 13300 | 6.8 | 4.5 × 10¹¹ | −50.7 | +81.3 |
| 40 | 14550 | 4.8 | 2.1 × 10¹² | −55.1 | −20.7 |

TABLE 12

Properties of Samples Nos. 41 to 52

| Sample No. | ε (20° C.) | tan δ (20° C.) (%) | Specific Resistivity (Ω · cm) | Δε/ε (20° C.) −30° C. (%) | 85° C. (%) |
|---|---|---|---|---|---|
| 41 | 6980 | 0.7 | 1.7 × 10¹³ | +3.3 | −54.3 |
| 42** | 24510 | 3.1 | 5.8 × 10¹¹ | −71.4 | −67.8 |
| 43 | 17630 | 1.9 | 9.6 × 10¹¹ | −53.6 | −54.5 |
| 44** | 7210 | 7.5 | 6.0 × 10¹¹ | −36.5 | +39.3 |
| 45 | 8160 | 3.8 | 8.3 × 10¹² | −51.2 | −32.9 |
| 46** | 6240 | 3.1 | 9.6 × 10¹² | −44.8 | −53.2 |
| 47* | 7220 | 6.5 | 5.7 × 10¹¹ | −46.5 | +42.6 |
| 48* | 8740 | 5.0 | 8.3 × 10¹¹ | −58.6 | +9.1 |
| 49** | 8500 | 4.2 | 6.5 × 10¹² | −52.3 | −43.2 |
| 50 | 8410 | 1.7 | 8.1 × 10¹² | −34.6 | −39.4 |
| 51** | 16250 | 2.3 | 4.3 × 10¹² | −53.8 | −41.2 |
| 52 | 13060 | 1.3 | 6.5 × 10¹² | −40.8 | −37.2 |

Figure 4:
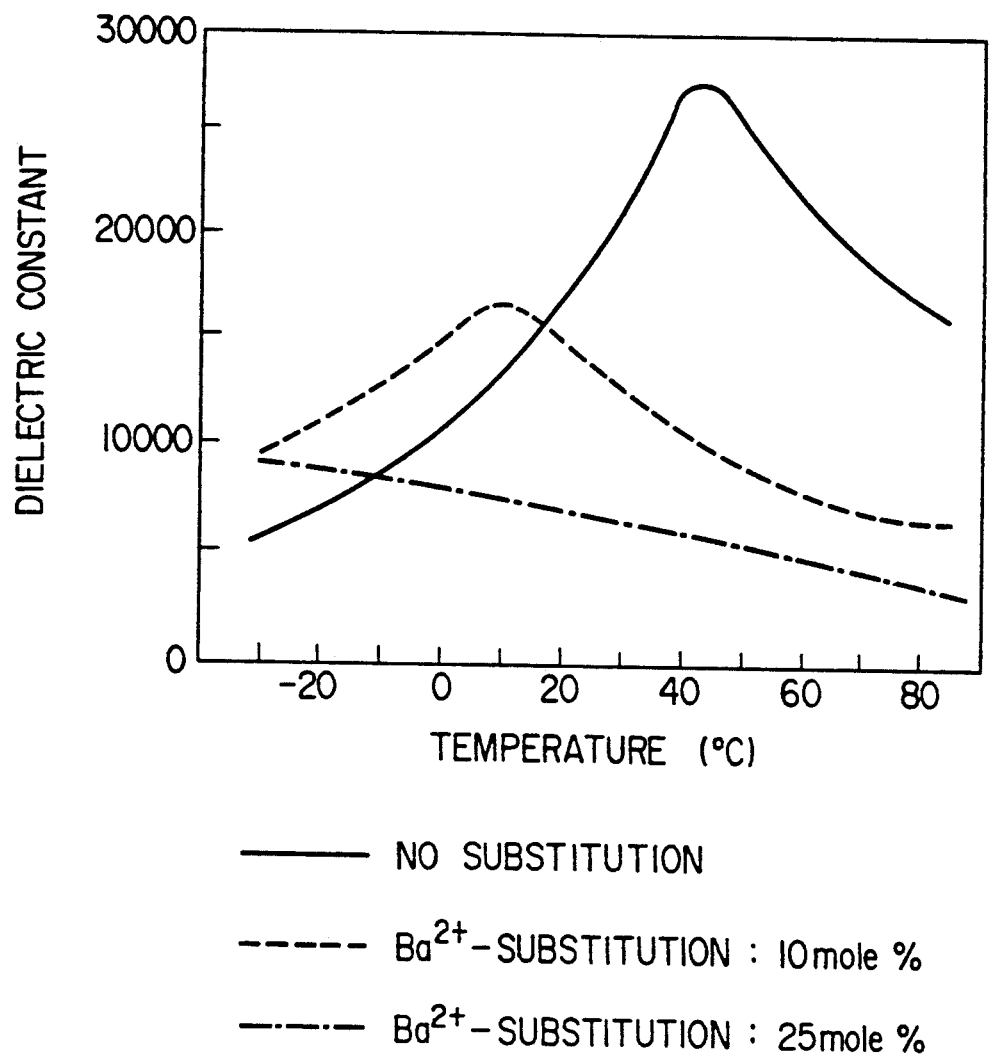
FIG. 4 is a graph showing the temperature-dependency of the dielectric constant of a further embodiment of the ceramic composition according to the present invention in which x, y and z are 0.50, 0.30 and 0.20 respectively and the amount of $Ba^{2+}$ substitution is 0, 10 or 25 mole %.

Moreover, to make clear the effect of Ba²⁺-substitution, there is shown, in FIG. 4, the temperature-dependency of the dielectric constant of a ceramic composition whose compounding ratio (x, y, z) was (0.50, 0.30, 0.20) and in which the amount of Ba²⁺-substitution was 0, 10 or 25 mole %.

As seen from the data shown in FIG. 4, there is observed a dielectric constant-depressing effect of the Ba²⁺-substitution and accordingly the Curie point of the main constituent is shifted towards the lower temperature side. Further, as seen from the data listed in Tables 7 to 12, the composition of the present invention in which part of Pb²⁺ in the main constituent, a ternary system essentially consisting of [Pb(Mg₁Nb₁)O₃]-[Pb(Ni₁Nb₁)O₃]-[PbTiO₃], is substituted with Ba²⁺ ions has a high dielectric constant and specific resistivity at room temperature as well as a low variation in dielectric constant with temperature and thus can satisfy the Y5U characteristics (−30° to 85° C.; +22%, −56%) as defined in the EIA Standards. Furthermore, the composition of the present invention can be sintered at a relatively low temperature in the order of not more than 1150° C. and correspondingly a silver-palladium alloy can be used as a material for the internal electrodes of multilayer ceramic capacitors.

EXAMPLE 4

The same procedures used in Example 3 were repeated to give a dielectric powder except that lead oxide, magnesium oxide, titanium oxide, nickel oxide, niobium oxide and barium carbonate were correctly weighed so that the resulting dielectric powder had a compounding ratio: (x, y, z) in the main constituent represented by [Pb(Mg₁Nb₁)O₃]$_x$[Pb(Ni₁Nb₁)O₃]$_y$[PbTiO₃]$_z$ of (0.50, 0.30, 0.20) and 10 mole % of Pb²⁺ ions were substituted with Ba²⁺ ions.

The resulting dielectric powder was dispersed in an organic solvent, kneaded with an organic binder to give a slurry and the resulting slurry was formed into a film having a thickness of 40 μm according to the doctor blade technique currently used. Then a paste for an internal electrode was printed on the film in accordance with the usual screen printing method, followed by stamping out the film into a desired shape, lamination, hot-pressing to give a multilayer body which was then cut into pieces having a desired shape to obtain green chips for capacitors. The resulting green chips were heated to desired temperatures to remove the binder and to fire and then silver paste was applied thereto to form external electrodes.

The capacitance of the capacitor was determined at room temperature by applying an alternating current having a frequency of 1 kHz and a voltage of 1 V r.m.s. using a digital LCR meter while a DC bias of 0 to 50 V was applied to the multilayer ceramic capacitor with a digital multi meter. The results thus obtained are plotted in FIG. 5.

COMPARATOR EXAMPLE 2

The same procedures used in Example 4 were repeated except for using a composition having the compounding ratio (x, y, z) in the main constituent represented by $Pb(Mg_{\frac{1}{3}}Nb_{\frac{2}{3}})O_3]_x[Pb(Ni_{\frac{1}{3}}Nb_{\frac{2}{3}})O_3]_y[PbTiO_3]_z$ of (0.20, 0.60, 0.20) and free of $Ba^{2+}$-substitution to give a capacitor and the capacitance thereof upon applying a DC bias was determined in the same manner described in Example 4. The results obtained are plotted in FIG. 5 together with the results obtained in Example 4.

Figure 5:
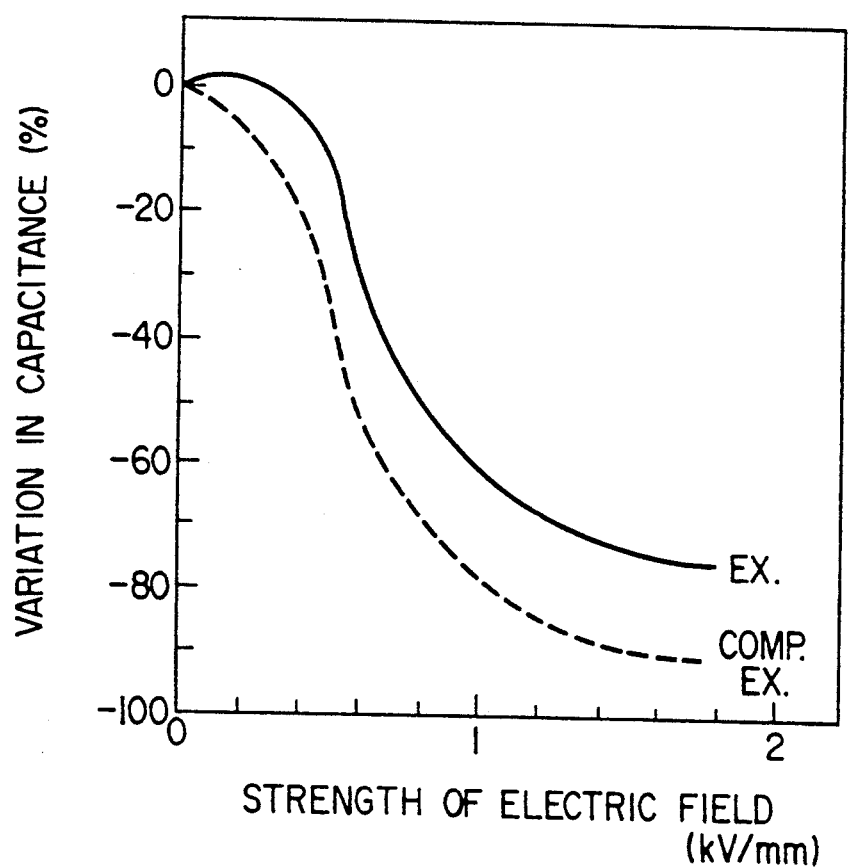
FIG. 5 is a graph in which the rate of variation in capacitance observed when a DC bias is applied to a multilayer ceramic capacitor is plotted against the strength of DC electric field per layer of the capacitor (as determined in Example 4 and Comparative Example 2)

The results shown in FIG. 5 clearly indicate that the capacitor obtained from the ceramic composition of the present invention in which part of the $Pb^{2+}$ ions in the main constituent was substituted with $Ba^{2+}$ ions shows the behavior upon application of a DC bias superior to that for the capacitor obtained using the composition of Comparative Example 2, which is free of $Ba^{2+}$-substitution.

EXAMPLE 5

In this Example, there were used, as starting materials, lead oxide (PbO), magnesium oxide (MgO), niobium oxide ($Nb_2O_5$), nickel oxide (NiO), titanium oxide ($TiO_2$) and calcium carbonate ($CaCO_3$) and these starting materials were weighed so as to satisfy the compounding ratio as shown in Tables 13 to 15.

These dispensed starting materials were subjected to wet-milling and mixing in a ball mill, calcined at 800° to 850° C., followed by re-milling of the resulting powder in a ball mill, filtration, drying, addition of an organic binder, sizing and pressing to give two disk-like samples having a diameter of about 16 mm and a thickness of about 2 mm and a cylindrical sample having a diameter of about 16 mm and a thickness of about 10 mm. The latter was used in the subsequent determination of sintering density.

Then the pressed disk-like samples were fired at a temperature ranging from 1100° to 1150° C. for one hour. Silver electrodes were printed onto both faces of the fired disk-like samples at 600° C. and the capacitances and dielectric losses thereof were determined at a frequency of 1 kHz, a voltage of 1 V r.m.s. and room temperature using a digital LCR meter. Then a current upon application of a DC voltage of 50 V to the samples for one minute was determined using an insulation resistance tester to determine specific resistivity of the samples. The dielectric constant was obtained from the capacitance determined above. Further, the capacitances at −30° and 85° C. were determined to obtain variations in dielectric constants in terms of values relative to that observed at 20° C.

Tables 13 to 15 show the compounding ratio: x, y and z of the main constituent: $[Pb(Mg_{\frac{1}{3}}Nb_{\frac{2}{3}})O_3]_x[Pb(Ni_{\frac{1}{3}}Nb_{\frac{2}{3}})O_3]_y[PbTiO_3]_z$ of the resulting ceramic composition, and the amount of $Ca^{2+}$-substitution (mole %) and Tables 16 to 18 show the dielectric constant at room temperature, the dielectric loss, the specific resistivity and the variations of dielectric constants determined at −30° C. and 85° C. (in terms of values relative to that observed at 20° C.) which were determined in this example.

In these tables, the asterisk (*) means that the compounding ratio of the main constituent of the corresponding sample is beyond the range defined in the present invention and double asterisk (**) means that the amount of $Ca^{2+}$-substitution is beyond the range defined in the present invention.

TABLE 13

Compounding Ratios of Sample Nos. 1 to 20

| Sample No. | $Pb(Mg_{\frac{1}{3}}Nb_{\frac{2}{3}})O_3$ (mole %) | $Pb(Ni_{\frac{1}{3}}Nb_{\frac{2}{3}})O_3$ (mole %) | $PbTiO_3$ (mole %) | Amount of $Ca^{2+}$-Substitution (mole %) |
|---|---|---|---|---|
| 1* | 80 | 0 | 20 | 10 |
| 2** | 75 | 15 | 10 | 0 |
| 3 | 75 | 15 | 10 | 1 |
| 4 | 75 | 15 | 10 | 5 |
| 5** | 75 | 5 | 20 | 0 |
| 6 | 75 | 5 | 20 | 10 |
| 7 | 75 | 5 | 20 | 25 |
| 8** | 65 | 10 | 25 | 0 |
| 9 | 65 | 10 | 25 | 10 |
| 10** | 62.5 | 5 | 32.5 | 0 |
| 11 | 62.5 | 5 | 32.5 | 25 |
| 12** | 62.5 | 5 | 32.5 | 30 |
| 13** | 60 | 20 | 20 | 0 |
| 14 | 60 | 20 | 20 | 5 |
| 15 | 60 | 20 | 20 | 10 |
| 16 | 60 | 20 | 20 | 25 |
| 17* | 50 | 40 | 10 | 0 |
| 18* | 50 | 40 | 10 | 2 |
| 19** | 50 | 30 | 20 | 0 |
| 20 | 50 | 30 | 20 | 0.01 |

TABLE 14

Compounding Ratios of Sample Nos. 21 to 40

| Sample No. | $Pb(Mg_{\frac{1}{3}}Nb_{\frac{2}{3}})O_3$ (mole %) | $Pb(Ni_{\frac{1}{3}}Nb_{\frac{2}{3}})O_3$ (mole %) | $PbTiO_3$ (mole %) | Amount of $Ca^{2+}$-Substitution (mole %) |
|---|---|---|---|---|
| 21 | 50 | 30 | 20 | 2 |
| 22 | 50 | 30 | 20 | 10 |
| 23 | 50 | 30 | 20 | 25 |
| 24** | 50 | 20 | 30 | 0 |
| 25 | 50 | 20 | 30 | 10 |
| 26 | 50 | 20 | 30 | 25 |
| 27* | 50 | 10 | 40 | 0 |
| 28* | 50 | 10 | 40 | 25 |
| 29* | 50 | 10 | 40 | 30 |
| 30** | 40 | 40 | 20 | 0 |
| 31 | 40 | 40 | 20 | 0.01 |
| 32 | 40 | 40 | 20 | 10 |
| 33** | 40 | 30 | 30 | 0 |
| 34 | 40 | 30 | 30 | 10 |
| 35 | 40 | 30 | 30 | 25 |
| 36** | 30 | 40 | 30 | 0 |
| 37 | 30 | 40 | 30 | 10 |
| 38 | 30 | 40 | 30 | 25 |
| 39** | 20 | 50 | 30 | 0 |
| 40 | 20 | 50 | 30 | 10 |

TABLE 15

Compounding Ratios of Sample Nos. 41 to 52

| Sample No. | $Pb(Mg_{\frac{1}{3}}Nb_{\frac{2}{3}})O_3$ (mole %) | $Pb(Ni_{\frac{1}{3}}Nb_{\frac{2}{3}})O_3$ (mole %) | $PbTiO_3$ (mole %) | Amount of $Ca^{2+}$-Substitution (mole %) |
|---|---|---|---|---|
| 41 | 20 | 50 | 30 | 25 |
| 42** | 10 | 67.5 | 22.5 | 0 |
| 43 | 10 | 67.5 | 22.5 | 2 |
| 44** | 10 | 47.5 | 42.5 | 0 |
| 45 | 10 | 47.5 | 42.5 | 25 |
| 46** | 10 | 47.5 | 42.5 | 30 |
| 47* | 5 | 60 | 35 | 0 |
| 48* | 5 | 60 | 35 | 10 |
| 49** | 10 | 70 | 20 | 0 |
| 50 | 10 | 70 | 20 | 2 |
| 51** | 15 | 70 | 15 | 0 |
| 52 | 15 | 70 | 15 | 2 |

TABLE 15

Properties of Samples Nos. 1 to 20

| Sample No. | $\epsilon$ (20° C.) | tan δ (20° C.) (%) | Specific Resistivity (Ω · cm) | $\Delta\epsilon/\epsilon$ (20° C.) −30° C. (%) | $\Delta\epsilon/\epsilon$ (20° C.) 85° C. (%) |
|---|---|---|---|---|---|
| 1* | 8600 | 4.1 | $9.8 \times 10^{13}$ | −57.2 | −25.6 |
| 2** | 22560 | 7.3 | $2.1 \times 10^{11}$ | −63.7 | −64.5 |
| 3 | 25350 | 5.6 | $3.1 \times 10^{11}$ | −64.8 | −66.4 |
| 4 | 16400 | 1.6 | $8.5 \times 10^{11}$ | −41.6 | −55.8 |
| 5** | 13710 | 6.9 | $1.7 \times 10^{11}$ | −64.1 | +57.3 |
| 6 | 10560 | 3.1 | $6.5 \times 10^{11}$ | −43.1 | −39.6 |
| 7 | 6540 | 1.2 | $2.1 \times 10^{12}$ | −41.6 | −53.9 |
| 8** | 10320 | 7.1 | $2.6 \times 10^{11}$ | −54.1 | +72.1 |
| 9 | 12650 | 5.1 | $8.1 \times 10^{11}$ | −56.1 | −35.6 |
| 10** | 8310 | 7.6 | $2.9 \times 10^{11}$ | −52.6 | +51.0 |
| 11 | 6140 | 4.3 | $3.6 \times 10^{12}$ | −55.1 | +5.8 |
| 12** | 7520 | 4.4 | $1.8 \times 10^{12}$ | −50.8 | −21.5 |
| 13** | 16720 | 6.5 | $3.1 \times 10^{11}$ | −62.3 | +13.7 |
| 14 | 13500 | 4.2 | $6.4 \times 10^{11}$ | −57.0 | −37.1 |
| 15 | 10650 | 1.6 | $9.6 \times 10^{11}$ | −48.1 | −40.5 |
| 16 | 7140 | 1.1 | $3.5 \times 10^{12}$ | −11.3 | −47.3 |
| 17* | 15200 | 3.1 | $3.0 \times 10^{11}$ | −56.5 | −70.3 |
| 18* | 16340 | 2.1 | $5.1 \times 10^{11}$ | −32.5 | −61.5 |
| 19** | 17080 | 6.9 | $3.9 \times 10^{11}$ | −68.5 | −5.2 |
| 20 | 19160 | 6.1 | $4.5 \times 10^{11}$ | −66.7 | −12.3 |

TABLE 17

Properties of Samples Nos. 21 to 40

| Sample No. | $\epsilon$ (20° C.) | tan δ (20° C.) (%) | Specific Resistivity (Ω · cm) | $\Delta\epsilon/\epsilon$ (20° C.) −30° C. (%) | $\Delta\epsilon/\epsilon$ (20° C.) 85° C. (%) |
|---|---|---|---|---|---|
| 21 | 21380 | 5.6 | $5.8 \times 10^{11}$ | −61.3 | −35.4 |
| 22 | 16550 | 2.1 | $9.6 \times 10^{11}$ | −41.5 | −57.3 |
| 23 | 6860 | 0.9 | $2.6 \times 10^{12}$ | +21.5 | −45.3 |
| 24** | 10240 | 6.5 | $4.0 \times 10^{11}$ | −21.5 | +41.5 |
| 25 | 15320 | 4.5 | $1.1 \times 10^{12}$ | −58.0 | −5.5 |
| 26 | 9560 | 1.3 | $3.3 \times 10^{12}$ | −47.3 | −50.6 |
| 27* | 6120 | 6.3 | $4.5 \times 10^{11}$ | −20.3 | +85.1 |
| 28* | 6830 | 5.5 | $3.9 \times 10^{12}$ | −43.4 | +47.6 |
| 29* | 5660 | 4.9 | $3.1 \times 10^{12}$ | −49.7 | +27.9 |
| 30** | 18700 | 6.7 | $4.1 \times 10^{11}$ | −62.6 | −18.3 |
| 31 | 20020 | 5.3 | $5.6 \times 10^{12}$ | −59.8 | −24.6 |
| 32 | 12850 | 2.0 | $1.6 \times 10^{12}$ | −31.3 | −53.4 |
| 33** | 8560 | 6.8 | $4.3 \times 10^{11}$ | −29.8 | +36.3 |
| 34 | 11570 | 4.2 | $9.4 \times 10^{11}$ | −51.6 | +3.6 |
| 35 | 7960 | 1.5 | $5.7 \times 10^{12}$ | −41.5 | −53.9 |
| 36** | 12510 | 7.0 | $4.6 \times 10^{11}$ | −41.7 | +61.3 |
| 37 | 13810 | 5.1 | $9.2 \times 10^{11}$ | −46.6 | +8.3 |
| 38 | 8850 | 2.1 | $5.8 \times 10^{12}$ | −39.6 | −55.0 |
| 39** | 13300 | 6.8 | $4.5 \times 10^{11}$ | −50.7 | +81.3 |
| 40 | 15140 | 5.0 | $9.6 \times 10^{11}$ | −56.2 | −12.4 |

TABLE 18

Properties of Samples Nos. 41 to 52

| Sample No. | $\epsilon$ (20° C.) | tan δ (20° C.) (%) | Specific Resistivity (Ω · cm) | $\Delta\epsilon/\epsilon$ (20° C.) −30° C. (%) | $\Delta\epsilon/\epsilon$ (20° C.) 85° C. (%) |
|---|---|---|---|---|---|
| 41 | 7140 | 0.8 | $6.1 \times 10^{12}$ | +8.0 | −57.2 |
| 42** | 24510 | 3.1 | $5.8 \times 10^{11}$ | −71.4 | −67.8 |
| 43 | 26500 | 1.6 | $8.4 \times 10^{12}$ | −68.2 | −70.5 |
| 44** | 7210 | 7.5 | $6.0 \times 10^{11}$ | −36.5 | +39.3 |
| 45 | 10960 | 4.9 | $5.8 \times 10^{12}$ | −52.9 | −28.4 |
| 46** | 8710 | 5.1 | $4.2 \times 10^{12}$ | −48.3 | −40.1 |
| 47* | 7220 | 6.5 | $5.7 \times 10^{11}$ | −46.5 | +42.6 |
| 48* | 9130 | 5.2 | $7.3 \times 10^{11}$ | −60.2 | +1.5 |
| 49** | 8500 | 4.2 | $6.5 \times 10^{12}$ | −52.3 | −43.2 |
| 50 | 9340 | 1.2 | $7.8 \times 10^{12}$ | −31.4 | −41.3 |
| 51** | 16250 | 2.3 | $4.3 \times 10^{12}$ | −53.8 | −41.2 |
| 52 | 13850 | 1.1 | $5.7 \times 10^{12}$ | −37.9 | −40.7 |

Moreover, to make clear the effect of $Ca^{2+}$-substitution, there is shown, in FIG. 6, the temperature-dependency of the dielectric constant of a ceramic composition whose compounding ratio (x, y, z) was (0.50, 0.30, 0.20) and in which the amount of $Ca^{2+}$-substitution was 0, 10 or 25 mole %.

As seen from the data shown in FIG. 6, there is observed a dielectric constant-depressing effect of the $Ca^{2+}$-substitution and accordingly the Curie point of the main constituent is shifted towards the lower temperature side. Further, as seen from the data listed in Tables 13 to 18, the composition of the present invention in which part of the $Pb^{2+}$ ions in the main constituent, a ternary system essentially consisting of $[Pb(Mg_{\frac{1}{3}}Nb_{\frac{2}{3}})O_3]$-$[Pb(Ni_{\frac{1}{3}}Nb_{\frac{2}{3}})O_3]$-$[PbTiO_3]$, is substituted with $Ca^{2+}$ ions have a high dielectric constant and specific resistivity at room temperature as well as a low variation in dielectric constant with temperature and thus can satisfy the Y5U characteristics (−30° to 85° C.; +22%, −56%) as defined in the EIA Standards. Furthermore, the composition of the present invention can be sintered at a relatively low temperature in the order of not more than 1150° C. and correspondingly a silver-palladium alloy can be used as a material for the internal electrodes of multilayer ceramic capacitors.

EXAMPLE 6

The same procedures used in Example 5 were repeated to give a dielectric powder except that lead oxide, magnesium oxide, titanium oxide, nickel oxide, niobium oxide and calcium carbonate were correctly weighed so that the resulting dielectric powder had a compounding ratio: (x, y, z) in the main constituent represented by $[Pb(Mg_{\frac{1}{3}}Nb_{\frac{2}{3}})O_3]_x[Pb(Ni_{\frac{1}{3}}Nb_{\frac{2}{3}})O_3]_y[PbTiO_3]_z$ of (0.50, 0.30, 0.20) and 10 mole % of $Pb^{2+}$ ions were substituted with $Ca^{2+}$ ions.

The resulting dielectric powder was dispersed in an organic solvent, kneaded with an organic binder to give a slurry and the resulting slurry was formed into a film having a thickness of 40 μm according to the doctor blade technique currently used. Then a paste for an internal electrode was printed on the film in accordance with the usual screen printing method, followed by stamping out the film into a desired shape, lamination, hot-pressing to give a multilayer body which was then cut into pieces having a desired shape to obtain green chips for capacitors. The resulting green chips were heated to desired temperatures to remove the binder and to fire and then a silver paste was applied thereto to form external electrodes.

The capacitance of the capacitor was determined at room temperature by applying an alternating current having a frequency of 1 kHz and a voltage of 1 V r.m.s. using a digital LCR meter while a DC bias of 0 to 50 V was applied to the multilayer ceramic capacitor with a digital multi meter. The results thus obtained are plotted in FIG. 7.

COMPARATIVE EXAMPLE 3

The same procedures used in Example 6 were repeated except for using a composition having the compounding ratio (x, y, z) in the main constituent represented by $[Pb(Mg_{\frac{1}{3}}Nb_{\frac{2}{3}})O_3]_x[Pb(Ni_{\frac{1}{3}}Nb_{\frac{2}{3}})O_3]_y[PbTiO_3]_z$ of (0.20, 0.60, 0.20) and free of $Ca^{2+}$-substitution to give a capacitor and the capacitance thereof upon applying a DC bias was determined in the same manner described in Example 6. The results obtained are plotted in FIG. 7 together with the results obtained in Example 6.

The results shown in FIG. 7 clearly indicate that the capacitor obtained from the ceramic composition of the present invention in which part of $Pb^{2+}$ ions in the main constituent was substituted with $Ca^{2+}$ ions shows the behavior upon application of a DC bias superior to that for the capacitor obtained using the composition of Comparative Example 3, which was free of $Ca^{2+}$-substitution.

Incidentally, the Curie points of ceramic compositions whose main constituents are beyond the range defined in the present invention are deviated from room temperature to the temperature side much higher or lower than room temperature and, therefore, such compositions suffer from such a problem that the dielectric constants thereof at room temperature are very low, that the temperature-dependency of the dielectric constant is high within the practical temperature range or that the specific resistivities thereof are low. Moreover, if the amount of $Sr^{2+}$-, $Ba^{2+}$- or $Ca^{2+}$-substitution is beyond each corresponding range defined in the present invention, the resulting composition is not applicable as a material for use in making capacitors since it suffers from such a problem that the capacitance is too low or that the Curie point thereof is greatly deviated from room temperature.

The ceramic composition of the present invention has a high dielectric constant at room temperature and a low temperature-dependency of dielectric constant, which can be achieved through the substitution of $Pb^{2+}$ ions in the main constituent with a predetermined amount of $Sr^{2+}$, $Ba^{2+}$ or $Ca^{2+}$ ions since such ion-substitution permits the shift of the Curie point of the main constituent towards the low temperature side and the depression of the temperature-dependency of dielectric constant. Further, the ceramic composition of the invention shows a low decrease in the capacitance upon application of a DC bias and has a specific resistivity higher than that of the composition free of the substitution of $Pb^{2+}$ ions. Thus, the ceramic composition makes it possible to provide a multilayer ceramic capacitor having excellent temperature-dependency of dielectric constant and high reliability. Further, the firing temperature thereof is not more than 1150° C. and this allows the use of silver-palladium alloys as a material for internal electrodes of capacitors. The composition is likewise applicable to such a multilayer ceramic capacitor as a switching power source which is used while applying a DC bias since the decrease in the capacitance upon application of a DC bias is relatively small as has already been discussed above.

What is claimed is:

1. A ceramic composition comprising, as a main constituent, a ternary system essentially consisting of lead magnesium niobate, $[Pb(Mg_{\frac{1}{3}}Nb_{\frac{2}{3}})O_3]$, lead nickel niobate, $[Pb(Ni_{\frac{1}{3}}Nb_{\frac{2}{3}})O_3]$ and lead titanate. $[PbTiO_3]$ and being expressed by the following general formula: $[Pb(Mg_{\frac{1}{3}}Nb_{\frac{2}{3}})O_3]_x[Pb(Ni_{\frac{1}{3}}Nb_{\frac{2}{3}})O_3]_y[PbTiO_3]_z$ wherein the subscripts x, y and z satisfy the following relation: $x+y+z=1.0$ and fall within the area defined by the line segments joining the following seven points (a) to (g) which are given by the coordinates:

| (x = 0.10, | y = 0.70, | z = 0.20) | (a) |
| (x = 0.10, | y = 0.475, | z = 0.425) | (b) |
| (x = 0.625, | y = 0.05, | z = 0.325) | (c) |
| (x = 0.75, | y = 0.05, | z = 0.20) | (d) |
| (x = 0.75, | y = 0.15, | z = 0.10) | (e) |
| (x = 0.50, | y = 0.40, | z = 0.10) | (f) |
| (x = 0.15, | y = 0.70, | z = 0.15) | (g) | on the triangular ternary-system diagram; and wherein part of $Pb^{2+}$ ions of the main constituent are substituted with 0.01 to 30 mole % of strontium ions ($Sr^{2+}$).

2. The ceramic composition of claim 1 wherein the amount of $Sr^{2+}$-substitution ranges from 2 to 20 mole %.

3. A ceramic composition comprising, as a main constituent, a ternary system essentially consisting of lead magnesium niobate, $[Pb(Mg_{\frac{1}{3}}Nb_{\frac{2}{3}})O_3]$, lead nickel niobate, $[Pb(Ni_{\frac{1}{3}}Nb_{\frac{2}{3}})O_3]$, and lead titanate, $[PbTiO_3]$, and being expressed by the following general formula: $[Pb(Mg_{\frac{1}{3}}Nb_{\frac{2}{3}})O_3]_x[Pb(Ni_{\frac{1}{3}}Nb_{\frac{2}{3}})O_3]_y[PbTiO_3]_z$ wherein the subscripts x, y and z satisfy the following relation: $x+y+z=1.0$ and fall within the area defined by the line segments joining the following seven points (a) to (g) which are given by the coordinates:

| (x = 0.10, | y = 0.70, | z = 0.20) | (a) |
| (x = 0.10, | y = 0.475, | z = 0.425) | (b) |
| (x = 0.625, | y = 0.05, | z = 0.325) | (c) |
| (x = 0.75, | y = 0.05, | z = 0.20) | (d) |
| (x = 0.75, | y = 0.15, | z = 0.10) | (e) |
| (x = 0.50, | y = 0.40, | z = 0.10) | (f) |
| (x = 0.15, | y = 0.70, | z = 0.15) | (g) | on the triangular ternary-system diagram; and wherein part of $Pb^{2+}$ ions of the main constituent are substituted with 0.01 to 25 mole % of barium ions ($Ba^{2+}$).

4. The ceramic composition of claim 3 wherein the amount of $Ba^{2+}$-substitution ranges from 2 to 20 mole %.

5. A ceramic composition comprising, as a main constituent, a ternary system essentially consisting of lead magnesium niobate $[Pb(Mg_{\frac{1}{3}}Nb_{\frac{2}{3}})O_3]$, lead nickel niobate, $[Pb(Ni_{\frac{1}{3}}Nb_{\frac{2}{3}})O_3]$, and lead titanate $[PbTiO_3]$ and being expressed by the following general formula: $[Pb(Mg_{\frac{1}{3}}Nb_{\frac{2}{3}})O_3]_x[Pb(Ni_{\frac{1}{3}}Nb_{\frac{2}{3}})O_3]_y[PbTiO_3]_z$ wherein the subscripts x, y and z satisfy the following relation: $x+y+z=1.0$ and fall within the area defined by the line segments joining the following seven points (a) to (g) which are given by the coordinates:

| (x = 0.10, | y = 0.70, | z = 0.20) | (a) |
| (x = 0.10, | y = 0.475, | z = 0.425) | (b) |
| (x = 0.625, | y = 0.05, | z = 0.325) | (c) |
| (x = 0.75, | y = 0.05, | z = 0.20) | (d) |
| (x = 0.75, | y = 0.15, | z = 0.10) | (e) |
| (x = 0.50, | y = 0.40, | z = 0.10) | (f) |
| (x = 0.15, | y = 0.70, | z = 0.15) | (g) | on the triangular ternary-system diagram; and wherein part of $Pb^{2+}$ ions of the main constituent are substituted with 0.01 to 25 mole % of calcium ions ($Ca^{2+}$).

6. The ceramic composition of claim 5 wherein the amount of the $Ca^{2+}$-substitution ranges from 2 to 20 mole %.

7. The ceramic composition of claim 1 wherein the amount of $Sr^{2+}$ substituted is about 2, 10 or 30 mole %.

8. The ceramic composition of claim 3 wherein the amount of $Ba^{2+}$ substituted is 5, 10 or 25 mole %.

9. The ceramic composition of claim 5 wherein the amount of $Ca^{2+}$ substituted is 5, 10 or 25 mole %.

* * * * *